US008125330B2

(12) United States Patent
Hess

(10) Patent No.: US 8,125,330 B2
(45) Date of Patent: Feb. 28, 2012

(54) PORTABLE ALARM AND METHODS OF TRANSMITTING ALARM DATA

(75) Inventor: Brian K. Hess, Westerville, OH (US)

(73) Assignee: Tattletale Portable Alarm Systems, Inc., Westerville, OH (US)

(*) Notice: Subject to any disclaimer, the term of this patent is extended or adjusted under 35 U.S.C. 154(b) by 13 days.

(21) Appl. No.: 12/025,497

(22) Filed: Feb. 4, 2008

(65) Prior Publication Data

US 2008/0180241 A1 Jul. 31, 2008

Related U.S. Application Data

(63) Continuation-in-part of application No. 10/867,124, filed on Jun. 14, 2004, now Pat. No. 7,327,220.

(60) Provisional application No. 60/477,998, filed on Jun. 11, 2003.

(51) Int. Cl.
*G08B 1/08* (2006.01)

(52) U.S. Cl. ............................... 340/539.11; 340/539.13

(58) Field of Classification Search .............. 340/539.11
See application file for complete search history.

(56) References Cited

U.S. PATENT DOCUMENTS

| 4,506,253 | A | * | 3/1985 | Mande et al. | ................. | 340/506 |
|---|---|---|---|---|---|---|
| 5,587,701 | A | * | 12/1996 | Hess | ............................. | 340/541 |
| 5,777,551 | A | * | 7/1998 | Hess | ............................. | 340/541 |
| 5,850,180 | A | * | 12/1998 | Hess | ............................. | 340/541 |
| 6,049,273 | A | * | 4/2000 | Hess | ........................ | 340/539.11 |
| 6,831,557 | B1 | * | 12/2004 | Hess | ........................ | 340/539.16 |
| 7,131,136 | B2 | * | 10/2006 | Monroe | ........................ | 725/105 |
| 7,327,220 | B2 | * | 2/2008 | Hess | ........................ | 340/286.11 |
| 2004/0008253 | A1 | * | 1/2004 | Monroe | ........................ | 348/143 |
| 2004/0257208 | A1 | * | 12/2004 | Huang et al. | ............... | 340/426.1 |
| 2005/0146606 | A1 | * | 7/2005 | Karsenty et al. | ............... | 348/143 |
| 2006/0176167 | A1 | * | 8/2006 | Dohrmann | .................... | 340/506 |

* cited by examiner

*Primary Examiner* — Travis Hunnings
(74) *Attorney, Agent, or Firm* — Rader, Fishman & Grauer PLLC

(57) ABSTRACT

A portable alarm system includes a wireless receiver configured to receive signals from remote wireless devices and a processor in communication with the wireless receiver, wherein the processor is configured to receive the signals from the wireless receiver. The system further includes an intelligent communications interface in communication with the processor, the intelligent communications interface being configured to receive and translate into wireless digital data at least a portion of the signals from the processor, and transmit the wireless digital data to an external location.

18 Claims, 4 Drawing Sheets

PORTABLE ALARM AND METHODS OF TRANSMITTING ALARM DATA

CROSS REFERENCE TO RELATED APPLICATIONS

This application is a Continuation-in-Part of U.S. Ser. No. 10/867,124, with a filing date of Jun. 14, 2004, now U.S. Pat. No. 7,327,220 which is related to U.S. Ser. No. 60/477,998, with a filing date of Jun. 11, 2003, which applications are hereby incorporated by reference in their entirety.

BACKGROUND

Alarm systems of various types have been in existence for many years. Alarm systems play in integral part in protecting assets within as well as the safety of those within monitored premises. Alarm systems are now available for automobiles as well as for building structures, such as homes, businesses, and the like.

In home alarm systems are usually hard-wired throughout a home, with the wiring usually terminating at a control panel located somewhere within the home. One of the main drawbacks to a hard-wired alarm system is that the system is permanently installed in the home and offers nothing to the original purchaser when he or she moves to another home. Further, the installation of hard-wired alarm systems is labor intensive, and therefore, requires significant expense to pay for the installation. Still further, via their reliance on hard-wired telephone systems, such conventional alarm systems are easy targets for savvy intruders who know how to quickly and easily dismantle the systems by cutting the telephone lines on which the alarm systems rely.

The conventional security alarm system market does not offer alternatives for the millions of citizens that live, for example, in apartments, hotel rooms, leased office space, and short term warehousing in which a person would not intend to stay for a relatively long period of time, and thus, would not wish to invest significant expense in a permanent alarm system. It is exactly these types of environments where crime is often the highest.

Home alarm systems are frequently connected to the home's telephone wiring to automatically place a call to a monitoring station at some distance away from the home to warn those at the monitoring station that a possible illegal entry has occurred at the home. This, in theory, enables those at the monitoring station to either send a security officer to the home or to place a call to the police to have a police officer inspect the home where the alarm was activated. A drawback of this type of system is that sophisticated burglars are knowledgeable of such systems and will cut the telephone wires prior to entry into the home, thereby rendering the security monitor station useless because when the illegal entry occurs, the system will not function to place the automatic call to the security monitor station.

Typically, alarm systems that transmit an alarm signal to a location outside of the premises being monitored do so via transmission to a central monitoring station. Often the owner of the premises is not informed of an alarm until further time has elapsed. Once notified, the premise's owner or their agent is only then able to intervene as desired. Further, central monitoring stations and the resources that they dispatch (e.g., police, fire, etc.) charge considerable amounts of money for the services that they provide to the owner of the premises. While the owner may feel that these costs are justified in certain circumstances such as when critical information (e.g., notification of a fire or intruder in the premises being monitored) is transmitted, many owners have experienced frustration with the costs associated with "false alarms" or transmission of non-critical information. Further, there are situations in which the owner may be able to respond more quickly and effectively than the resources that may otherwise be dispatched by the central monitoring station. Thus, it is desirable for alarm systems to be portable, cost-efficient, and resistant to disarming by savvy intruders. There is also a need for further alarm transmission methods and devices associated with the same. In order to alleviate the frustrations and costs associated with the same, notifying the premise's owner or his or her agent promptly when an alarm signal is generated would be highly desirable in many situations.

BRIEF DESCRIPTION OF THE DRAWINGS

The foregoing brief description will be understood more completely from the following detailed description of the exemplary drawings, in which.

DETAILED DESCRIPTION

Figure 1:
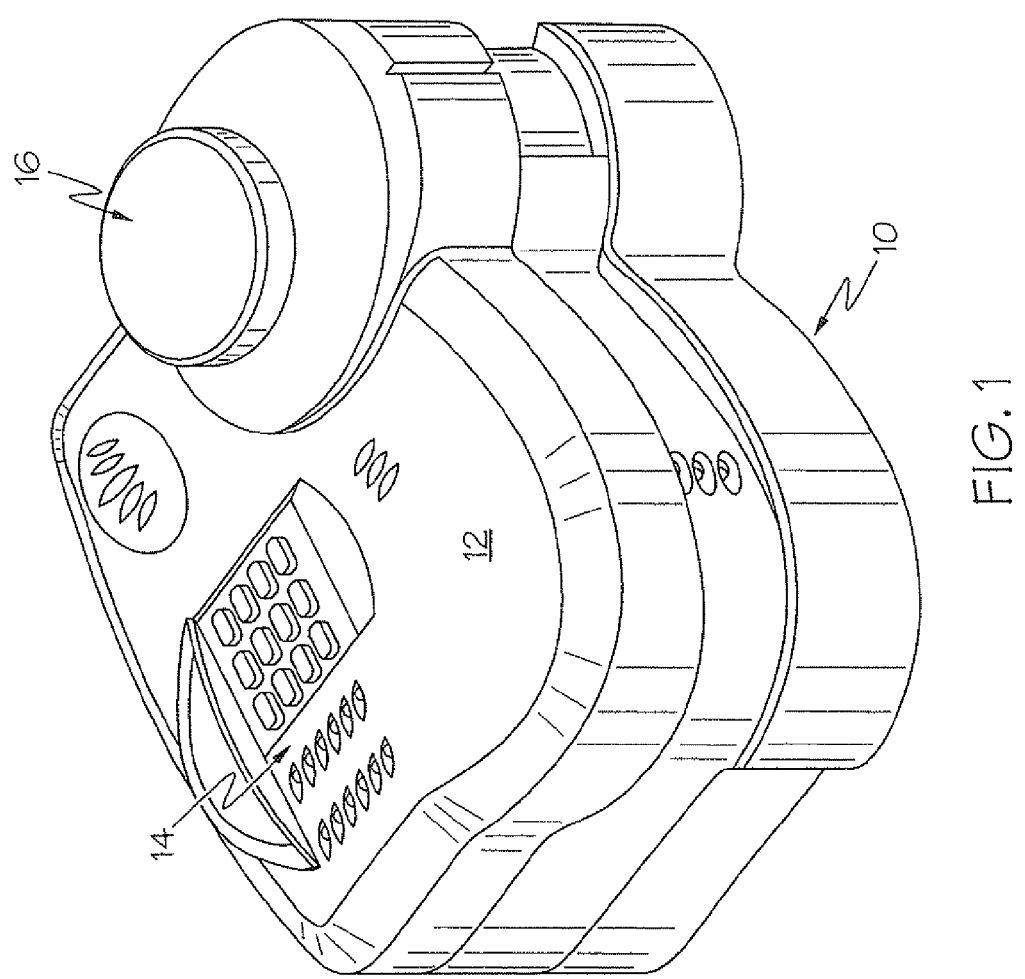
FIG. 1 is a perspective view of an exemplary alarm system according to an embodiment.

FIG. 1 is a perspective view of an exemplary alarm system 10 contained in a portable enclosure 12. The alarm system 10 may have a keypad 14 for inputting information to the system 10 and a strobe light 16 mounted on the outside of the portable enclosure 12.

Figure 2:
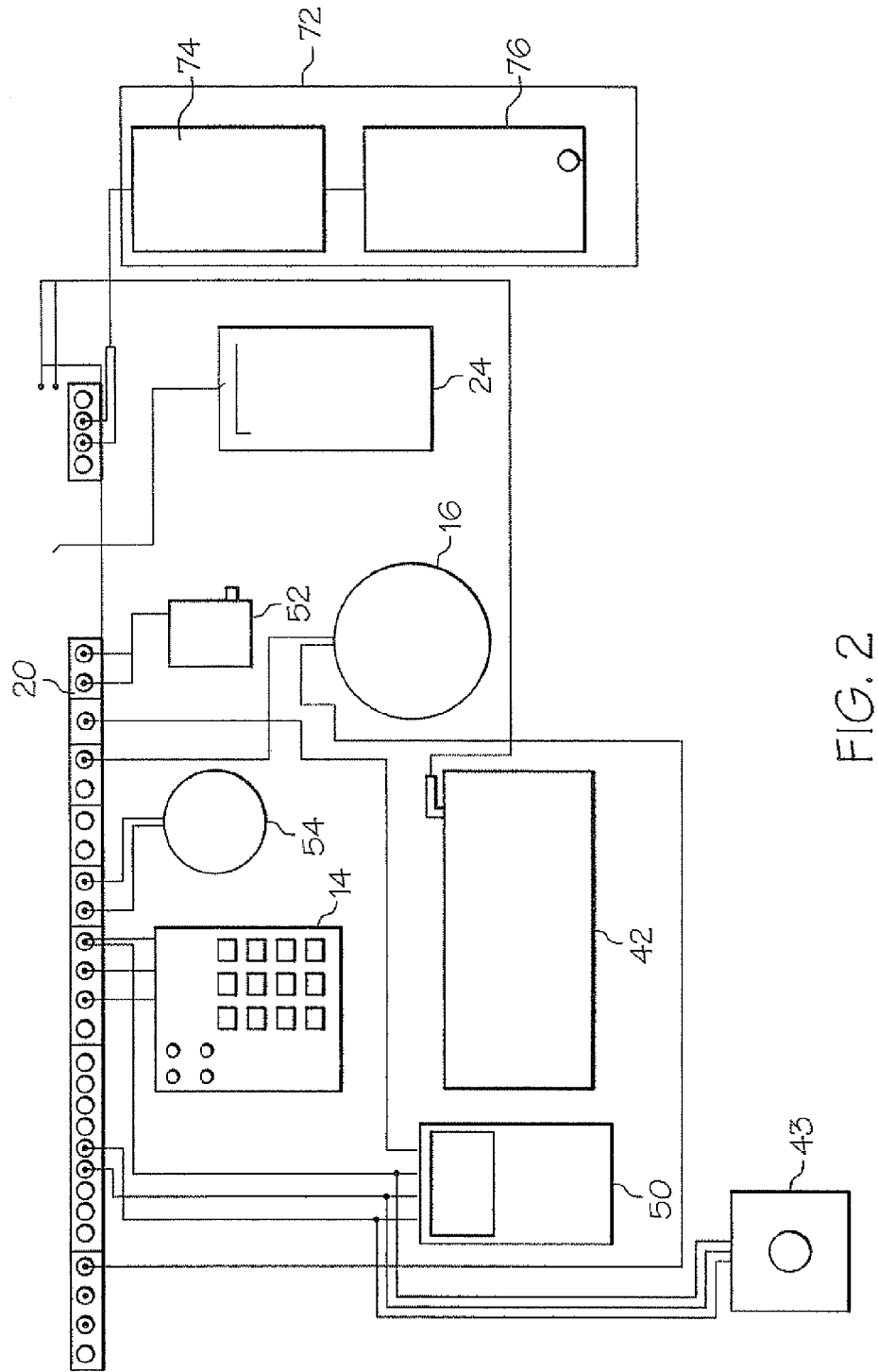
FIG. 2 is a schematic illustration of an exemplary alarm system according to an embodiment.

Referring now to FIG. 2, a schematic view of the alarm system 10 and sensors 25 separate from the portable alarm enclosure 12 are illustrated. It will be understood that any suitable portable alarm system may be used in conjunction with alarm system 10, including but not limited to, alarm systems illustrated in U.S. Pat. Nos. 6,441,731; 6,049,273; 5,850,180; 5,777,551; and 5,587,701, which are incorporated by reference herein. The alarm system 10 has a processor 20 such as a microprocessor that controls the alarm system 10. The microprocessor 20 receives alarm data and may be a microcomputer based control panel. For example, the microprocessor 20 may be a commercially available alarm board or any other suitable type of microprocessor board. The microprocessor 20 processes data received from various inputs and sends appropriate signals to other components of the alarm system 10 according to the received inputs as discussed below.

In one embodiment, keypad 14 is electrically connected to the microprocessor 20. For example, the keypad 14 may be wired to clock, data, and communications inputs of the microprocessor 20. The keypad 14 may be used to program the alarm system 10 according to specific user needs and may be capable of multiple user codes, which can be inputted to arm or disarm the alarm system 10. Additionally, the keypad 14 may be used to activate a panic feature that allows the user to activate an alarm sequence by the push of one, two, or more buttons. Additionally, the panic feature may be provided remotely from the keypad 14. For example, a remote panic button may be worn on a necklace of the user.

The keypad 14 may also be used to send a silent distress signal by actuating predetermined code numbers on the keypad 14. The keypad 14 also allows the user to program and configure the alarm system 10 in any suitable manner. For example, the user may program the alarm system 10 to monitor or bypass all or specific intruder zones or program specific alarm parameters. A wireless receiver 24 may be contained within the enclosure 12 and electrically connected to the microprocessor 20. The wireless receiver 24 may receive alarm signals from remote wireless devices (not shown) that may be used to monitor windows, doors, or may be motion sensors, wireless smoke detectors, and the like. If a signal is received by the wireless receiver 24 that indicates an alarm, the microprocessor 20 will cause an alarm.

The microprocessor 20 may be connected to a power transformer 52 to provide current to the microprocessor 20 from a source such as a conventional wall outlet. The AC inputs of the microprocessor 20 may be wired to the transformer 52. A battery 42 may act as a back-up power supply to the transformer 52, and the battery 42 may be recharged by receiving a trickle charge from the transformer 52.

The portable alarm enclosure 12 may have a motion sensor or sensors 50. The motion sensor 50 may be any suitable motion sensor and may be wired to any appropriate input location, such as a communications terminal of the microprocessor 20. The motion sensor 50 will send an activation signal to the microprocessor 20 when the sensor 50 is activated. The microprocessor 20 is programmed to recognize input signals from the motion sensor 50 and to cause an alarm when such signals are received.

The portable alarm enclosure 12 may also include a miniature surveillance camera 43. Any suitable camera 43 may be used. For example, a model TVX-01 camera available from TVX, Inc. in Broomfield, Colo. may be used. The camera 43 is electrically connected to the microprocessor 20. The alarm system 10 may have a siren 54 that is electrically connected to the microprocessor 20 and that may be activated by a signal from the microprocessor 20. It will be understood that the portable alarm system 10 may have more components or fewer components than illustrated and that the alarm system is not limited to the illustrated components.

The alarm system 10 has an intelligent communications interface 72 that comprises an intelligent communications board 74 and a radio component 76. The intelligent communications interface is connected to the microprocessor 20. The intelligent communications interface 72 may be any suitable interface that may receive alarm data from the microprocessor 20 and translate the alarm data to wireless digital data. For example, the intelligent communications interface 72 may have a microprocessor board 74 that is programmed to receive alarm data and translate any desired portion of the alarm data to wireless digital data.

The intelligent communications interface 72 may be programmed to translate any desired alarm data to any suitable type of wireless digital data for further transmission as discussed further herein. For example, the wireless digital data may comprise textual digital data such as short message service (SMS) type data. SMS was created when it was incorporated into the Global System for Mobiles (GSM) digital mobile phone standard. That technology, which is now widely available and used, provides the ability to send and receive text messages to and from, for example, mobile telephones. The text can comprise words or numbers or an alphanumeric combination. When the wireless digital data comprises SMS type data, the intelligent communications interface 72 may convert the alarm data to a text based command set, such as an AT command set, for SMS type transmission. In another example, the alarm data may be converted to multimedia messaging service (MMS) type data or general packet radio services (GPRS) type data. One of ordinary skill in the art understands that any type of wireless digital data can be used and that the radio component 76 is selected to utilize one or all of these data packet transport methods. In other words, the type, configuration and selection of the radio component 76 depends in part on the data packet method used to transport the wireless digital data across third party networks (e.g. Sprint, Verizon, Nextel, AT&T, etc.). These third party networks employ various types of wireless network solutions, including, but not limited to, Universal Mobile Telecommunications Systems (UTMS), Code Division Multiple Access (CDMA) Wideband Division Multiple Access (W-CDMA), General Packet Radio Services (GPRS) and High-Speed Downlink Packet Access (HSDPA) to name a few. The alarm system 10, and more specifically, the intelligent communications interface 72 and the radio component 76, are configured to be compatible with any data packet transport method or any wireless network solution.

The intelligent communications interface radio component 76 may be any suitable type of radio. The radio 74 is selected to be capable of transmitting and receiving the desired type of wireless digital data. For example, the radio 74 may be a cell phone that may transmit and receive SMS type data. The radio 74 may transmit the wireless digital data to any suitable type of service station as discussed further herein.

The alarm system 10 may additionally have a call feature that is activated by the microprocessor 20 that places a call to a central monitoring center in addition to the transmission of the wireless digital data by the intelligent communications interface 72. Suitable systems for placing such a call by landline, cell phone, and Cellemetry are disclosed in U.S. Pat. Nos. 6,441,731; 6,049,273; 5,850,180; 5,777,551; and 5,587,701, which are incorporated by reference herein.

Figure 3:
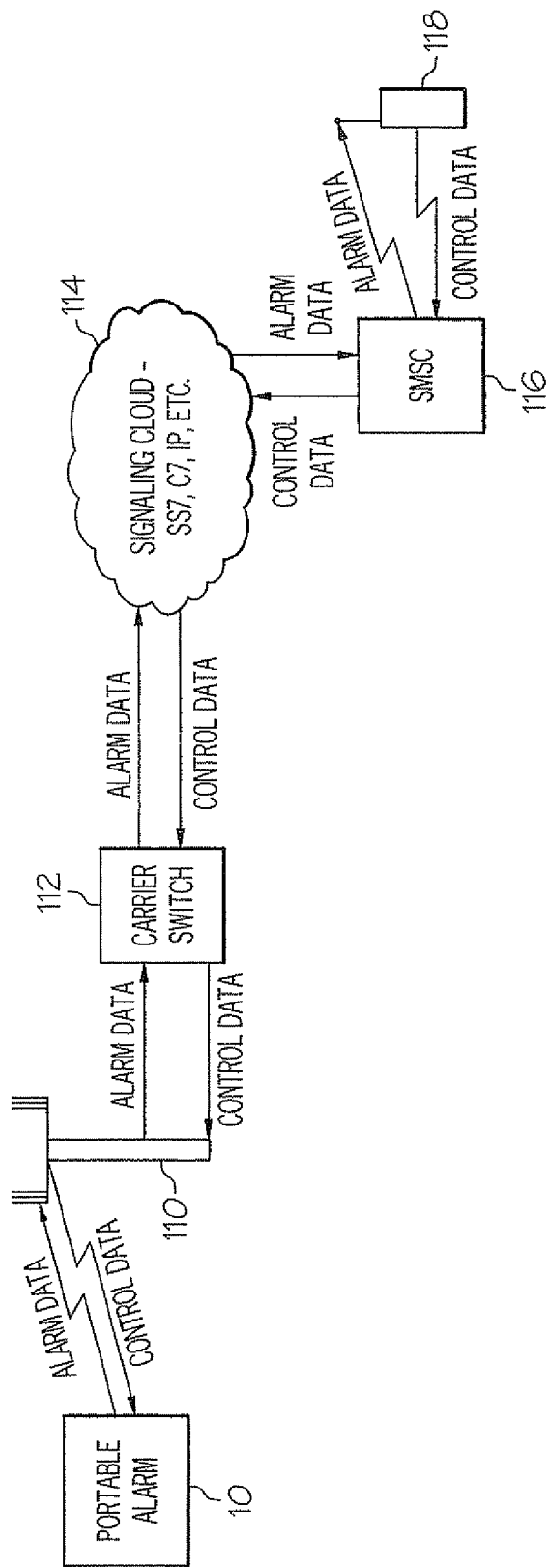
FIG. 3 is a flow diagram illustrating an exemplary flow of alarm information to and from a digital device.

Referring now to FIGS. 2 and 3, the transmission of the wireless digital data in accordance with one embodiment will be discussed. It will be understood that although the wireless digital data is illustrated as being of SMS type data, but may be of any type. Upon receipt of alarm data from the microprocessor 20, the intelligent communications interface 72 determines what alarm data should be converted to wireless digital alarm data, and converts the data to SMS type data. Additionally, the intelligent communications interface 72 determines where the data should be sent based on the programming of the intelligent communications interface 72, and the intelligent communications interface 72 transmits the wireless digital alarm data via the radio 76 to a radio tower 110. It will be understood that the intelligent communications interface may transmit the data to as many locations as desired.

The wireless digital alarm data is received by the tower 110 and transmitted to a carrier switch 112. The wireless digital alarm data is then transmitted via a signaling cloud 114 to a service center 116 such as a short message service center (SMSC). The wireless digital alarm data may be transmitted via any suitable type of network signal. For example, the data may be transmitted via the SS7 (Signal System 7) generic data transmission network conventionally used in the United States and available through companies such as VeriSign Inc. (Mountain View, Calif.) and TSI Telecommunications Services Inc. (Tampa, Fla.)), the C7 network that is the data transmission network comparable to SS7 that is conventionally used in European countries, and/or the IF (internet protocol) transmission network, or any other similar data transmission networks.

The service center 116 then transmits the wireless digital alarm data in the form of a text message to the appropriated digital device 118, and an acknowledgement of receipt of the data may be sent back to the alarm 10 either from the service center 116 or from the tower 110. The digital device 118 may be any suitable device capable of receiving SMS type data, or any wireless digital data. For example, the digital device 118 may be a cell phone, personal digital assistant, internet enabled computer, or the like. In this manner, the alarm user may receive a notification of the alarm on the digital device 118. Although the digital device 118 is illustrated as being in direct communication with the service center 116, communications between digital device 118 and the service center 116 may effected in a variety of ways, such as via a signaling cloud 114 and transmission tower, such as tower 110.

Additionally, control data may be sent by the digital device 118 to the intelligent communications interface 72. The control data may be in the form of an SMS text message that is received by the service center 116 and transmitted to the portable alarm system 10 via any desired network. Once the control data is received by the intelligent communications interface 72, the intelligent communications interface 72 may translate the control data into the appropriate data format and transmit the data to the microprocessor 20 so that the alarm 10 may be controlled remotely. The interactive alarm processor 72 may be programmed to allow any suitable type of alarm control such as arming or disarming via a remote device.

Figure 4:
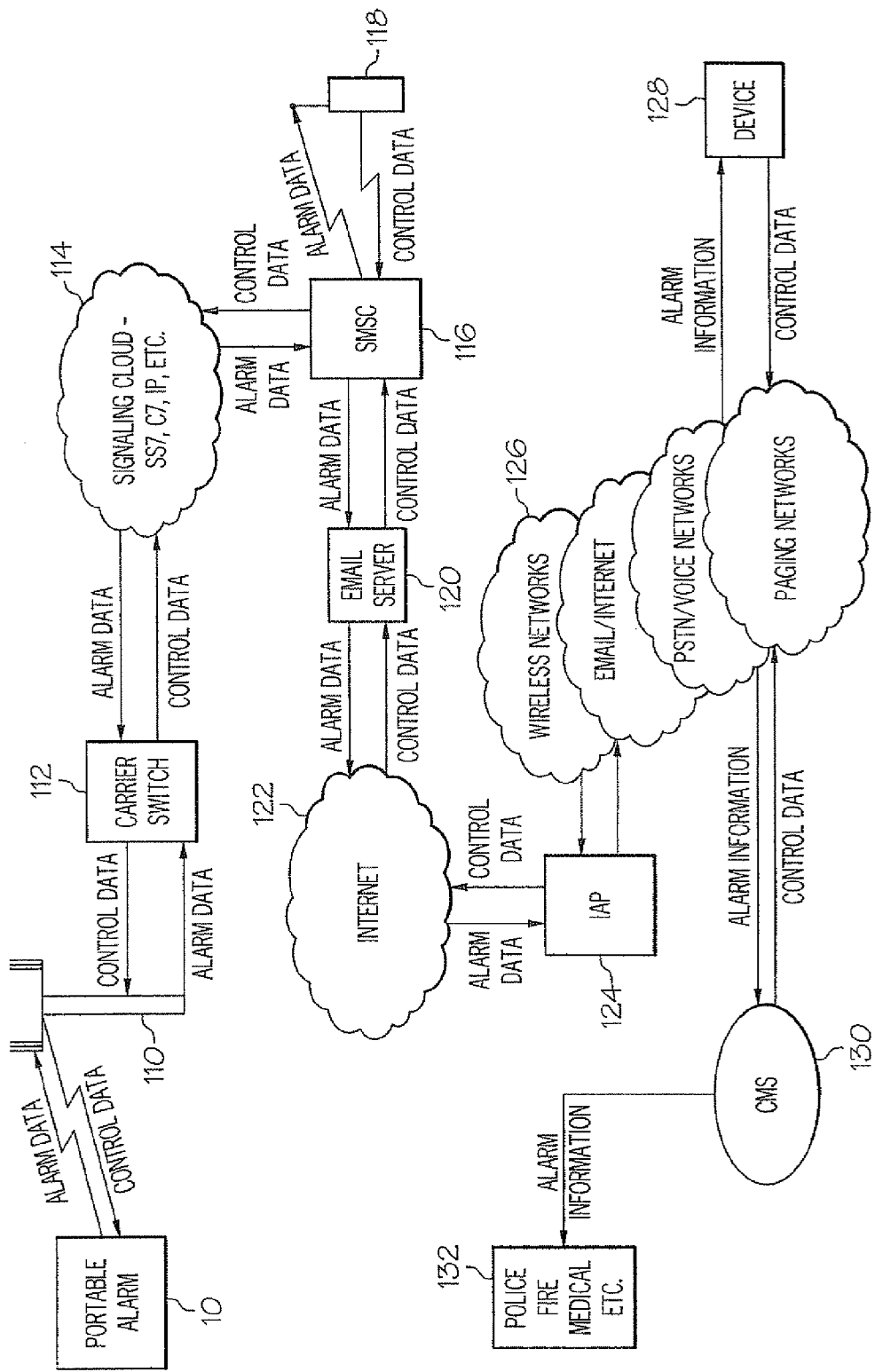
FIG. 4 is a flow diagram illustrating an exemplary flow of alarm information with an interactive alarm processor.

Referring now to FIGS. 2 and 4, an alternative embodiment is illustrated wherein the intelligent communications interface 72 may transmit data directly to a digital device 118 as discussed above in accordance with the embodiment illustrated in FIG. 3. In addition to or instead of the transmission of the wireless digital alarm data being transmitted to a digital device 118 via the service station 116, the intelligent communications interface 72 may be programmed to transmit the wireless digital alarm data to an interactive alarm processor 124 for processing and further transmittal as discussed herein. The service station 116 may transmit the wireless digital alarm data to the interactive alarm processor 124 in any suitable manner. For example, the wireless digital alarm data may be transmitted to an email server 120 and then transmitted via the internet 122 to the interactive alarm processor 124.

The interactive alarm processor 124 is any suitable device that is capable of receiving the information transmitted from intelligent communications interface 72 and rerouting that information as desired to one or more of the locations as discussed herein. For example, as schematically illustrated in FIG. 4, the interactive alarm processor 124 may be a remotely hosted, internet accessible, user-configurable routing device. In one embodiment, a wide variety of commercially available computer servers can be used in conjunction with appropriate software to function as the interactive alarm processor 124. Those of ordinary skill in the art of computer programming can readily design such software if a suitable alternative is not found to be commercially available. LINUX and e++, for example, are able to be so adapted to affect desired receipt and rerouting of information received from the alarm system 10.

The interactive alarm processor 124 may be programmed to confirm successful receipt of data transmitted from the intelligent communications interface 72, and a confirmation or acknowledgement of the successful receipt of the wireless digital alarm data may be provided by the interactive alarm processor 124 to the intelligent communications interface 72. Based on the receipt, or lack thereof, of such a confirmation, the intelligent communications interface 72 can resend the information or send the information to one or more alternative destinations, based on its programming.

Once the interactive alarm processor 124 has received the wireless digital alarm data, the interactive alarm processor 124 may process and transmit the data in accordance with its programming. In one example, the wireless digital alarm data may be processed into alarm information for dispersal to further locations as discussed herein. For example, the interactive alarm processor 124 may be initially programmed with an identification of the portable alarm 10 and with information about what alarm information to send and where to send alarm information in the event of the receipt of wireless digital alarm data from a particular portable alarm 10.

In one embodiment, the interactive alarm processor 124 may be programmed to transmit the alarm information derived from the alarm data to at least one device 128. The interactive alarm processor 124 formats the alarm data. For example, the interactive alarm processor 124 may translate the alarm data into alarm information having the necessary format for further transmission to the at least one device 128 via any suitable network 126. Examples of suitable networks 126 include, but are not limited to, wireless networks, email/internet networks, PSTN/voice networks, and/or paging networks. The interactive alarm processor 124 then transmits the alarm information to at least one device 128 via the appropriate network 126. The device 128 may be any suitable device such as wired, wireless, portable, or static device. For example, the device 128 may be a cellular telephone, pager, personal digital assistant, an internet server, public switched telephone network (PSTN), or e-mail account of the premise's owner or agent. The alarm information may be formatted and sent to a plurality of devices 128.

The device 128 may receive any suitable notification from the interactive alarm processor 124 such as alarm information indicating that an alarm has occurred. The device 128 may send control data to the alarm system 10 via the interactive alarm processor 124 and the service center 116 as illustrated. Thus, the portable alarm 10 may be remotely controlled via the interactive alarm processor 124. For example, the alarm 10 may be disarmed remotely. Additionally, the status of the alarm 10 may be checked remotely from the device 128.

The interactive alarm processor 124 may additionally format and send alarm information to a conventional central monitoring station 130. The central monitoring station 130 may further send out alarm information to emergency personnel 132, such as the police, fire department, or emergency medical services. The central monitoring station 130 may also send control data or any other type of information to the interactive alarm processor 124, and the central monitoring station 130 may remotely control the alarm 10 in the same manner as the device 128.

The interactive alarm processor 124 may be configured by a user to provide alarm information in any desired manner. For example, the interactive alarm processor 124 could be accessed via the internet by a user, and the interactive alarm processor 124 could be programmed to send a notification in the event of an alarm to any number or user supplied devices 128. Additionally, the interactive alarm processor 124 may be accessed or programmed to assist in alarm troubleshooting.

It will be obvious to those skilled in the art that various changes may be made without departing from the scope of the invention, which is not to be considered limited to what is described in the specification. The appended claims have been particularly shown and described with reference to the foregoing embodiments, which are merely illustrative of the best modes for carrying out the invention defined by the appended claims. It should be understood by those skilled in the art that various alternatives to the embodiments described herein may be employed in practicing the invention defined by the appended claims without departing from the spirit and scope of the invention as defined in claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the appended claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A portable alarm system, comprising:
   a wireless receiver configured to receive signals from remote wireless sensors;
   a processor in communication with said wireless receiver, said processor being configured to receive said signals from said wireless receiver; and
   an intelligent communications interface in communication with said processor, said intelligent communications interface being configured to receive and translate at least a portion of said signals from said processor into wireless digital data, and transmit said wireless digital data to an external location; and
   a remote portable electronic device positioned at the external location, wherein said remote portable electronic device is configured to receive said wireless digital data and is configured to transmit a control signal to wirelessly control at least one function of said portable alarm system.

2. The alarm system of claim 1, wherein said intelligent communications interface includes a radio component configured to transmit and receive one or more types of wireless digital data.

3. The alarm system of claim 2, wherein said wireless digital data is configured to transmit across any wireless network.

4. The alarm system of claim 2, wherein said radio component utilizes at least one data packet transport method.

5. The portable alarm system of claim 1, wherein said portable electronic device is selected from the group comprising: a cellular telephone, a personal digital assistant (PDA), and an internet enabled personal computer.

6. A portable alarm system, comprising:
   a processor configured to receive alarm signals; and
   an intelligent communications interface in communication with said processor, said intelligent communications interface being configured to receive and translate at least a portion of said alarm signals from said processor into wireless digital data, and transmit said wireless digital data to a remote portable electronic device;
   wherein said intelligent communications interface is configured to receive wireless control data from said portable electronic device to remotely control said portable alarm system from a remote location.

7. The alarm system of claim 6, wherein said intelligent communications interface includes a radio component configured to transmit and receive one or more types of wireless digital data.

8. The alarm system of claim 7, wherein said wireless digital data is configured to transmit across any wireless network.

9. The alarm system of claim 7, wherein said radio component utilizes at least one data packet transport method.

10. The portable alarm system of claim 6, wherein said portable electronic device is selected from the group comprising: a cellular telephone, a personal digital assistant (PDA), and an internet enabled personal computer.

11. A method for transmitting alarm data comprising:
    receiving alarm data from at least one alarm sensor;
    translating at least a portion of said alarm data into wireless digital data;
    wirelessly transmitting said wireless digital data to a remote portable electronic device; and
    wirelessly transmitting at least one wireless digital control data from said remote portable electronic device to control the at least one alarm sensor.

12. The method of claim 11, wherein transmitting said wireless digital data includes utilizing at least one data packet transport method.

13. The method of claim 11, wherein said wireless digital data is transported across any wireless network.

14. The method of claim 11, wherein said step of wirelessly transmitting comprises wirelessly transmitting said wireless data to a portable electronic device selected from the following group: a cellular telephone, a personal digital assistant (PDA), and an internet enabled personal computer.

15. A method for communicating with an alarm system comprising:
    obtaining alarm data from at least one alarm sensor;
    translating at least a portion of said alarm data into wireless digital data;
    wirelessly transmitting said wireless digital data to a remote portable electronic device;
    wirelessly transmitting alarm control data from said remote portable electronic device; and
    receiving said control data from said portable electronic device to remotely control said alarm system.

16. The method of claim 15, wherein transmitting said wireless digital data includes utilizing at least one data packet transport method.

17. The method of claim 15, wherein said wireless digital data is transported across any wireless network.

18. The method of claim 15, wherein said step of wirelessly transmitting comprises wirelessly transmitting said wireless data to a portable electronic device selected from the following group: a cellular telephone, a personal digital assistant (PDA), and an internet enabled personal computer.

* * * * *